May 29, 1962 J. FRASER Re. 25,173

SHOWER HEADS HAVING A CONSTANT VOLUME AUTOMATIC CONTROL DEVICE

Original Filed April 20, 1959 2 Sheets-Sheet 1

INVENTOR

James Fraser

BY Holcombe, Wetherill & Brisebois

ATTORNEYS

INVENTOR

James Fraser

BY Holcombe, Wetherill & Brisebois

ATTORNEYS

United States Patent Office

Re. 25,173
Reissued May 29, 1962

25,173

SHOWER HEADS HAVING A CONSTANT VOLUME AUTOMATIC CONTROL DEVICE

James Fraser, Wilmington, Del., assignor to Speakman Company, Wilmington, Del.

Original No. 3,007,648, dated Nov. 7, 1961, Ser. No. 807,381, Apr. 20, 1959. Application for reissue Jan. 26, 1962, Ser. No. 170,307
4 Claims. (Cl. 239—460)

Matter enclosed in heavy brackets [ ] appears in the original patent but forms no part of this reissue specification; matter printed in italics indicates the additions made by reissue.

This invention relates to a combination of a flow control device and valve structure.

One of the problems encountered in the modern community is the excessive use of water, industrially and domestically. It has become necessary to control the water consumption, particularly in household use. The present invention is for a flow control device that can be installed in conjunction with ordinary valve fixtures for use in controlling the flow of water and the quantity of water, and the individual problems of each separate installation.

It is an object of the present invention to so mount the control valve with the volume control device so as to permit ready access for repair without extensive dismantling of the assembly.

It is another object of the present invention to combine a flow control device with an ordinary plumbing fixture without excessive redesigning of the fixture.

The various features of novelty which characterize this invention are pointed out with particularity in the claims annexed to and forming part of this specification. For a better understanding of the invention, however, its advantages and specific objects obtained by its use, reference should be had to the accompanying drawings and descriptive matter in which have been illustrated a preferred embodiment of the invention.

Figure 1:
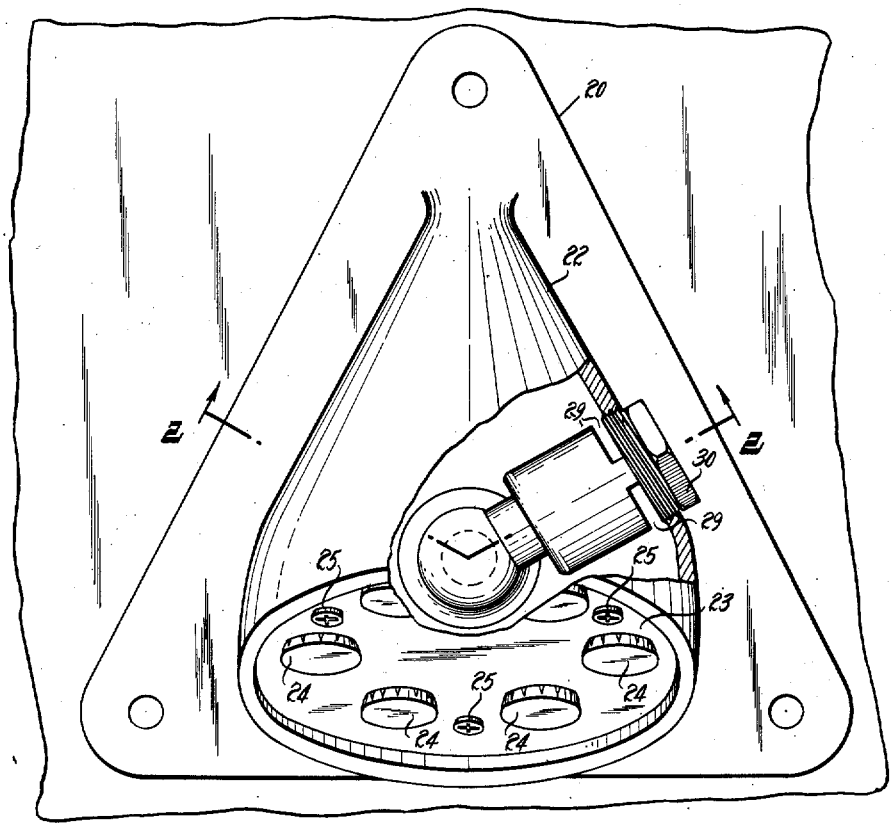
FIGURE 1 is a fragmentary front elevational view, partially broken away to show the mounting of the flow control unit.
Figure 2:
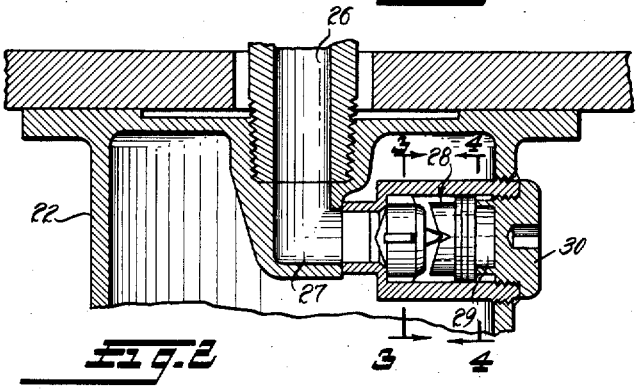
FIG. 2 is a fragmentary horizontal sectional view on line 2—2 of FIG. 1.
Figure 3:
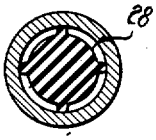
FIG. 3 is a vertical sectional view on line 3—3 of FIG. 2.
Figure 4:
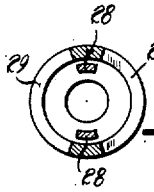
FIG. 4 is a vertical sectional view on line 4—4 of FIG. 2.

Referring more in detail to the drawings; a vandal proof shower head having a base plate 20 is attached to its support (not shown), and supports a casing 22, shown in FIG. 1. Across the lower end of the casing is a face plate 23 having plungers 24, 24 therein and being attached to the casing by means of machine screws 25, 25. Water is admitted to the casing by means of inlet 26, shown in FIG. 2, and passes through the conduit 27 through the yielding apertured disk type flow control device assembly 28 (shown in FIG. 3), and flows into the casing through the vents 29, 29, shown in FIG. 1, 2 and 4. The flow control device is held in position by means of the cap 30 which seals off the opening in the casing.

When mounting a shower head of this type, the shower head is fastened to the support, and the water supply inlet 26 is attached to the casing so that the conduit 27 is in communication with the inlet 26. The plungers 24, 24 are adjusted in the face plate 23 and the water control valve (not shown) is then opened. A constant volume spray is then delivered by this shower head regardless of variations in pressure of the water admitted to the inlet 26.

If it is desired to repair the regulator the cap 30 is removed, the regulator withdrawn and either repaired or replaced by a new one. This does not require the dismantling of the assembly and permits ready access to the flow control unit.

Figure 5:
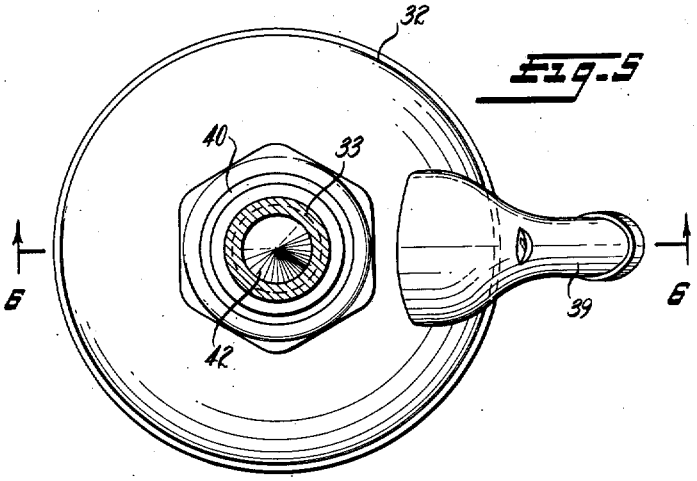
FIG. 5 is a plan view of a modification of this invention.
Figure 6:
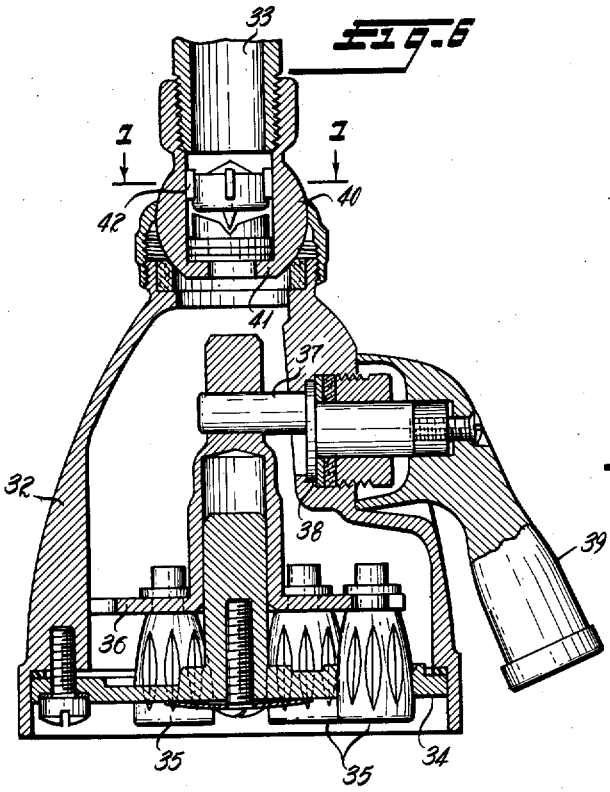
FIG. 6 is a vertical sectional view on line 6—6 of FIG. 5.
Figure 7:
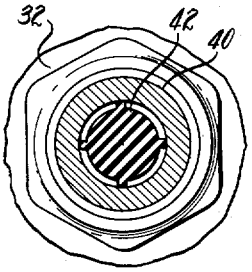
FIG. 7 is a horizontal sectional view on line 7—7 of FIG. 6.

The second modification of the device is shown in FIGS. 5, 6 and 7, wherein a manually controlled shower head has a casing 32, shown in FIG. 5. This casing has an inlet 33 at one end and a face plate 34 at the other end. The plungers 35, 35 are suspended on the yoke 36 and are retained within the opening in the face plate by means of this yoke which is suspended by the pin 37 attached to the eccentric 38, which is rotated by the handle 39, the plunger therefore being manually adjustable. The upper end of the casing has attached thereto a ball joint 40. Retained within the ball joint, by means of the lip 41, is a yielding apertured disk type flow control device 42, shown in FIGS. 6 and 7.

On assembly, the shower head has inserted within its ball joint the flow control device, and is then attached to the supply pipe having a water inlet 33. When the water is admitted through this inlet, the water is controlled by a valve (not shown) and it then flows past the flow control device 42 and into the shower head casing 32. The force of this spray is controlled by adjusting the plungers by means of the handle 39 within the face plate 34 but the volume of the spray is maintained constant by means of the yielding apertured disk type flow control device. When it is desired to either replace or inspect this device, the shower head is removed from the inlet 33 and the flow control device may then be removed from the ball joint. It is not necessary to remove the face plate 34 or in any way disassemble the shower head.

The automatic flow control device referred to above is of the yielding apertured type and usually comprises a bottom portion and an upper portion and a resilient portion therebetween which maintains a constant flow of water usually about 4½ gals. per minute from the shower head regardless of the pressure in the water main. This device is automatic and does not require any manual adjustment. It is not a manual valve similar to the usual shut-off valves associated with some shower heads but does comprise a unit which is placed wholly within the shower head and is not capable of adjustment without dissassembling the shower head.

While in accordance with the provisions of the statute the best forms of embodiment of this invention have been illustrated and described, it will be apparent to those skilled in the art that changes may be made in the form of the apparatus disclosed without departing from the spirit of this invention as set forth in the appended claim and that in some cases certain features may be used to advantage without a corresponding use of other features.

What is claimed is:

1. In a shower head producing a relatively constant volume shower irrespective of water pressure in the water main, the combination comprising: a casing having a water supply inlet and a spray outlet, a ball joint between the water main and the water supply inlet, an automatic flow control device comprising a supported bottom portion, a movable upper portion, a resilient portion between said upper and said bottom [portion] *portions,* said automatic flow control device being positioned in the ball joint between the water main and the casing, said spray ıtlet comprising a face plate having apertures therein ıd plungers manually, adjustably retained within the ısing.

2. In a shower head producing a relatively constant ›lume shower irrespective of water pressure in the water ain, the combination comprising: a casing having a ater supply inlet and a spray outlet, an automatic flow ›ntrol device comprising a supported bottom portion, a ovable upper portion, a resilient portion between said ›per and said bottom [portion] *portions,* said automatic ›w control device being positioned between the water ain and the casing, said spray outlet comprising a face ate having apertures therein and plungers within the ›erture fixed within the casing.

3. In a shower head producing a relatively constant ›lume shower irrespective of water pressure in the water ain, the combination comprising: a casing having a ater supply inlet and a spray outlet, an automatic flow ›ntrol device comprising a supported bottom portion, a ovable upper portion, a resilient portion between said ›per and said bottom [portion] *portions,* said automatic ›w control device being positioned in the source of water ıpply whereby the water flowing through the inlet must pass through the flow control device before entering the casing.

*4. A shower head producing a relatively constant volume shower irrespective of water pressure in the water main, the combination comprising; a casing having a water supply inlet and a spray outlet, a ball joint in said inlet, an automatic flow control device comprising a supported bottom portion, a movable upper portion, a resilient portion between said upper and said bottom portions, said automatic flow control device being positioned in the ball joint, whereby the water flowing through the inlet must pass through the flow control device before entering the casing.*

References Cited in the file of this patent or the original patent

UNITED STATES PATENTS

| | | |
|---|---|---|
| Re. 20,488 | Zinkil | Aug. 24, 1937 |
| 2,084,156 | Marsden | June 15, 1937 |
| 2,534,549 | Fraser | Dec. 19, 1950 |
| 2,756,108 | Warren | July 24, 1956 |
| 2,948,300 | Fraser | Aug. 9, 1960 |